Oct. 10, 1933.  H. HUEBER  1,929,531
WINDSHIELD CONSTRUCTION AND CLEANER THEREFOR
Filed Feb. 11, 1932
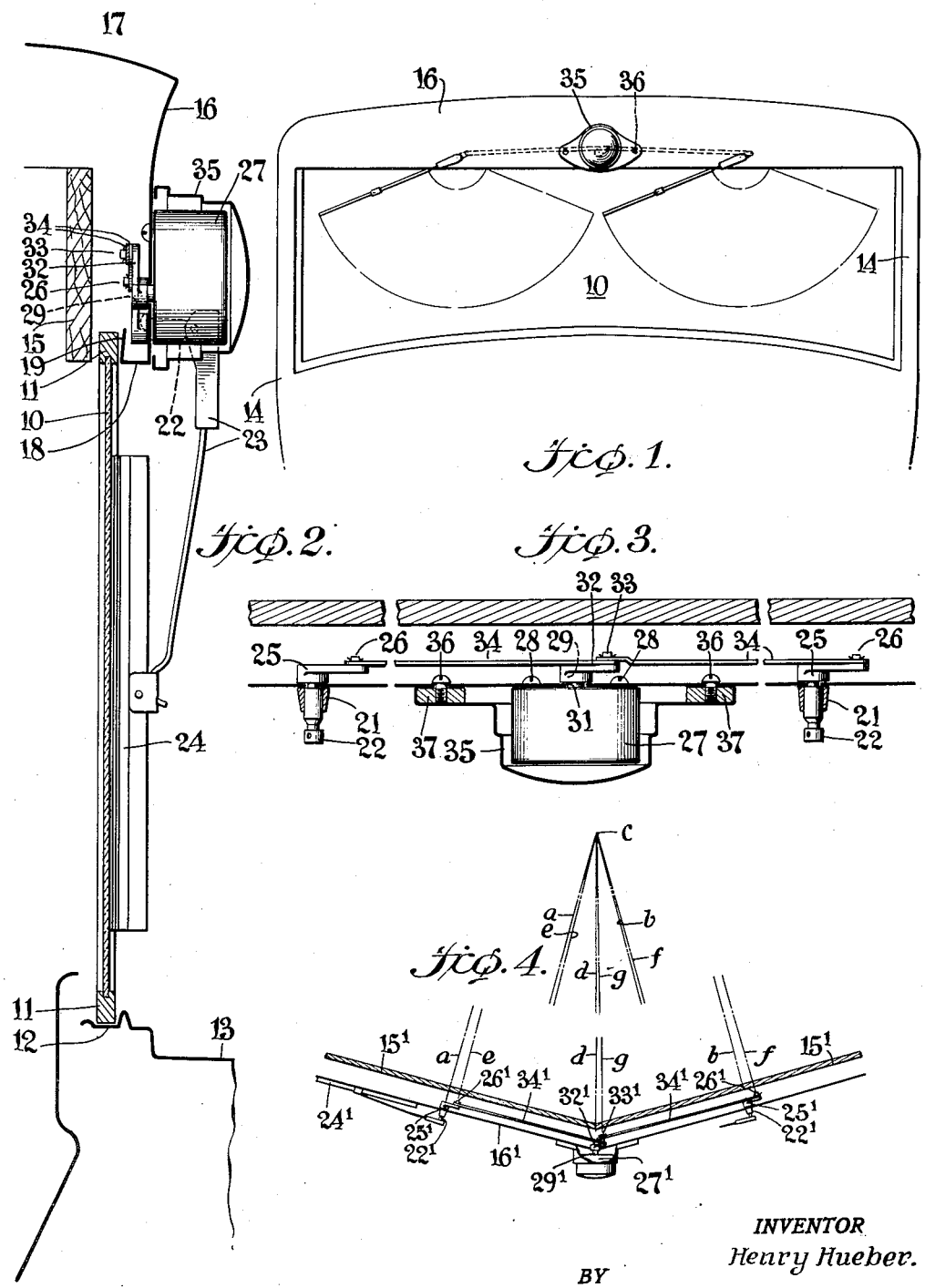
INVENTOR
Henry Hueber.
BY
Bean & Brooks. ATTORNEY Patented Oct. 10, 1933

1,929,531

UNITED STATES PATENT OFFICE 1,929,531

WINDSHIELD CONSTRUCTION AND CLEANER THEREFOR

Henry Hueber, Buffalo, N. Y., assignor to Trico Products Corporation, Buffalo, N. Y.

Application February 11, 1932. Serial No. 592,424

12 Claims. (Cl. 15—255)

This invention relates to a vehicle body structure including means for cleaning the windshield thereof.

Heretofore windshield cleaners have been conventionally in the nature of unitary attachments mounted on a portion of the vehicle body adjacent the windshield and have included wiper blades attached to and actuated by a motor operable by suction or electricity. With the provision of multiple blade cleaners, linkage has been provided on the vehicle exteriors for connecting the several wipers to one motor. With the trend of the motor industry to the elimination of the visor the windshield cleaner parts are exposed to the weather and fail to harmonize with the frontal appearance of the motor vehicle.

It is the object of this invention to improve the appearance of the automobile, and further to provide a header bar construction in which the windshield cleaner means is given adequate housing and is concealed to view both from the interior as well as the exterior of the vehicle.

These and other objects and advantages will become apparent to those skilled in the art from the following description of exemplary forms of the invention, reference being made to the accompanying drawing, wherein:

Fig. 1 is a front elevation showing the vehicle body adjacent to and including the windshield and windshield cleaner parts arranged according to the teachings of this invention.

Fig. 2 is a vertical sectional view through the windshield and the adjacent body structure, with certain of the windshield cleaner parts appearing in side elevation.

Fig. 3 is a plan sectional view of the structure shown in Figs. 1 and 2.

Fig. 4 is a horizontal sectional view, similar to that of Fig. 3, but showing another form of the invention.

As shown in Figs. 1 and 2, the vehicle body has a windshield 10 with a bordering frame 11. A trough-like portion 12, rearward of the cowl 13, normally supports the windshield, which may have vertical movement in upright side frame members 14. Extending across the windshield and joining the upright members is a hollow header structure which includes an inner wall 15, and, spaced therefrom, an outer or forward wall 16 which may merge with the roof 17 of the body. A flange 18 extends inwardly from the bottom of wall 16, and may have an upstanding terminal portion 19 spaced from inner wall 15 sufficiently to allow the windshield 10 to be moved vertically into the header.

The outer wall 16 of the header carries a pair of bearing members 21, spaced from each other and spaced from each end of the windshield, each for journalling a wiper rock shaft 22 which extends into the hollow interior of the header and beyond the outer wall of the header. Wiper carrying arms 23 carrying wiper blades 24 in contact with the outer face of the windshield are attached to the outer ends of the shafts 23 for movement therewith about the shaft axes. Crank arms 25 provided with crank pins 26 extend from the ends of the shafts that are within the header.

An actuating device 27 which may comprise an electric or fluid pressure motor, or equivalent device, is secured, as by fasteners 28, to the outer wall 16 of the header. The actuating device has a drive shaft 29 extending through an opening 31 in the header wall 16, and provided with a crank arm 32 having a crank pin 33. A wiper shaft operating means in the form of connecting rods 34 extend between the crank pins 26 and 33 so that upon rotation or oscillation of the drive shaft 29, the rock shafts 22 will be oscillated about their respective axes of rotation to carry the blades 24 across the windshield surface to clean the same.

In the type of windshield wherein the glass slides vertically within the header bar it is advisable if not necessary to mount the cleaner motor 27 on the exterior or front side of the header bar. However, the trend of the motor industry to eliminate the visor has left the cleaner motor exposed to the weather as well as presenting an inharmonious frontal appearance.

In accordance with the present invention I provide the headed bar with a removable front portion or housing section which is designed to harmonize with the front of the motor windshield, and to protect and conceal the motor as well as make the cleaner motor readily accessible. To this end, the forward wall 16 of the header bar is provided with a removable closure portion 35 having a central chamber, constituting a housing for the cleaner motor, and laterally extending portions merging into the general design of the header bar and having concealed anchoring blocks 37 with which securing fasteners 36 are connected from within so as not to mar the exterior surface. The removable header bar section 35 is of small expanse, as compared with the major dimensions of the header and where said section is raised and centrally disposed, as herein depicted, the frontal appearance of the entire motor vehicle is harmonious in design.

It is preferred that the distance between the outer wall 16 of the header and the inner ends of the crank pins 26 and 33 be no greater than the depth of flange 18, in order that raising of the windshield into the header bar will not interfere with the wiper linkage, or vice versa.

In the form of the invention shown in Fig. 4, for vehicle body constructions in which the windshield is of V-formation, or comprises a pair of angularly related sections, the walls 15' and 16' of the header are of like V-formation. The wiper carrying rock shafts 22' are journalled in wall 16' with their axes $a$ and $b$ perpendicular to the plane of the windshield sections and accordingly intersecting at a point $c$. The actuating device 27' is mounted centrally of the header, as in the form of the invention shown in Figs. 1, 2 and 3, and has a drive shaft 29' with a crank arm 32' and crank pin 33', the axis $d$ of the shaft 29' preferably intersecting the axes $a$ and $b$ at point $c$.

Rock shafts 22' have crank arms 25' and crank pins 26', the latter being connected to crank pin 33' by links 34' so that upon angular movement of the drive shaft, the rock shafts will likewise have angular movement, to move the wipers 24', which they carry, over the windshield surfaces. While sufficient play may be provided between the connection links and the crank pins to permit of the latter being formed parallel to their respective shafts, it is preferred that the axes of all the crank shafts and crank pins intersect at a common point in order that the parts will be in proper alignment during the various phases of movement. As illustrated in Fig. 5, the axes $e$ and $f$ of crank pin 26' and axis $g$ of crank pin 33' intersect at the common point $c$.

It will be understood that according to the present invention, the header of the vehicle is utilized as a cleaner housing and supporting means in addition to the function which it may serve as a recess for receiving the windshield upon raising of the latter. The operating mechanism of the cleaner is completely incased without resorting to separate casing means for the connecting linkage which would destroy or impair the symmetry of the vehicle body.

It will be further understood that various changes in the arrangement and structure of the parts involved, such as the formation of the wall 16 and casing 35 as an integral unit and with the motor compartment closed at the rear side by a removable plate, may be made within the purview of the invention, the foregoing description and drawing being merely illustrative of typical embodiments of the principles involved.

What is claimed is:

1. In combination, a windshield header bar having a centrally disposed chamber with a removable front wall, a pair of cleaner shafts journaled in the header bar at opposite sides of the chamber and protruding from the opposite faces of said bar, the forward ends of the shafts adapted for attachment by wiper operating means, a windshield cleaner motor arranged within the header bar chamber and mounted on the rear wall thereof, access being gained to said motor by removing said front wall, and means adjacent the rear face of the header bar operatively connecting the motor to said shafts.

2. In combination, a windshield header bar having a closed chamber to the front of the windshield glass and provided with a removable wall through which access is gained to the interior of the chamber, a windshield cleaner drive unit disposed within the chamber, a wiper shaft journaled in the header bar and spaced from the chamber, said shaft having its forward end protruding beyond the front face of the bar for attachment with a wiper, and means concealed by the header bar and operatively connecting the drive unit to the shaft.

3. In an automobile having a windshield without a visor, a windshield header bar having a chamber intermediate its ends, said chamber having a removable front wall, a cleaner motor mounted within the chamber of the bar, a wiper shaft journaled in the bar to one side of and spaced from the bar chamber, and a drive connection between the shaft and the motor, said removable front wall concealing the motor and completing the frontal appearance and surface of the header bar.

4. In combination with a vehicle body having a pair of substantially vertical and relatively angular windshield sections, a hollow header extending across said windshield sections and having a removable housing at the juncture of the latter sections, said header having an outer wall disposed forwardly of and substantially paralleling the planes of said windshield sections, a rock shaft journaled in said wall adjacent each of said windshield sections for actuating windshield wipers, crank arms having crank pins carried by said rock shafts within said hollow header, an actuating device secured in the housing and having a crank with a crank pin disposed within said hollow header, said actuating device being concealed by said removable housing and accessible upon removing the same, and links within said header connecting said crank pins.

5. In a vehicle body and windshield cleaner therefor, a windshield, upright frame members at the ends of the windshield guiding the latter for vertical movement, an outer header wall connecting said upright members and extending across said windshield, said outer wall being disposed forwardly of the plane of said windshield, an inner header wall disposed rearwardly of the plane of said windshield and fixed relative to the outer wall, whereby the windshield may be raised into the space between said walls, a wiper carrying shaft extending through and journaled in the outer wall and having a radial extension in said space between the walls, an actuating device, and a rigid member engaging said radial extension and the actuating device and between said outer wall and the plane of the windshield for reciprocation by the actuating device to oscillate said shaft.

6. In a vehicle body and windshield cleaner therefor, a hollow header extending across the top of the windshield and having inner and outer walls spaced from and on opposite sides of the plane of the windshield, a wiper shaft operably mounted upon the outer wall with a part of said shaft within said header, and an acuating device having a shaft extending into said header and operably connected to said part of the wiper shaft, said device being secured to the outer wall and extending forwardly therebeyond, said outer wall having a removable section concealing said device and connected to and carried by the body of said outer wall.

7. In a vehicle body and windshield cleaner, a windshield, a header extending across the top of the windshield and having a forward wall and a removable portion which together define an interior chamber, a wiper carrying shaft journaled in said wall, an actuating device secured to the rear wall of said chamber, the front chamber wall being removable to gain access to the actuating device, said rear wall having an opening therein, an actuating shaft extending from said device and through said opening into the hollow header, and means operably connecting said shafts within said header.

8. In a motor vehicle body construction including a windshield, a windshield receiving body part having a chamber with a removable closure wall, windshield cleaner operating means within the chamber and accessible upon removal of said wall, a wiper-carrying arm journalled on said body part for operating a wiper, and means operatively connecting the cleaner operating means to the wiper-carrying arm.

9. In a motor vehicle body construction including a windshield, a frame for the windshield having a centrally disposed chamber with a removable front wall, a windshield cleaner motor secured within the chamber, a pair of wiper shafts journaled in the frame and spaced from the chamber, said shafts having their forward ends protruding beyond the frame and adapted to carry wiper means, and means concealed by the frame and operatively connecting the motor to the wiper shafts.

10. In a motor vehicle body construction including a V-type windshield, a V-frame for the windshield, a cleaner motor mounted on the V-frame at one juncture of the sides thereof, a pair of wiper shafts journaled in the sides of the V-frame, said shafts being angularly disposed with respect to each other and to the axis of the motor, means operatively connecting the angularly disposed wiper shafts to the motor, said means being concealed by the V-frame, and a removable front portion secured to one juncture of the sides of the V-frame and forming therewith a housing which conceals the motor.

11. In a motor vehicle body construction including a windshield, a frame for the windshield, a wiper shaft operably mounted on the frame, a wiper shaft operating means operably connected to said shaft and concealed by said frame, a removable portion secured to one face of the frame and forming therewith a housing and an actuating device within the housing and operatively connected to the wiper shaft operating means.

12. In a motor vehicle body construction including a windshield, a windshield receiving frame, said frame having a forwardly facing wall substantially paralleling said windshield, a wiper actuating motor exteriorly mounted on said wall, and an exteriorly arranged closure member detachably secured to said wall and forming therewith a housing for said motor.

HENRY HUEBER.